April 14, 1936.                H. J. FRANKLIN                    2,037,624
                             BERRY PICKING MACHINE
                             Filed July 27, 1934         3 Sheets-Sheet 1
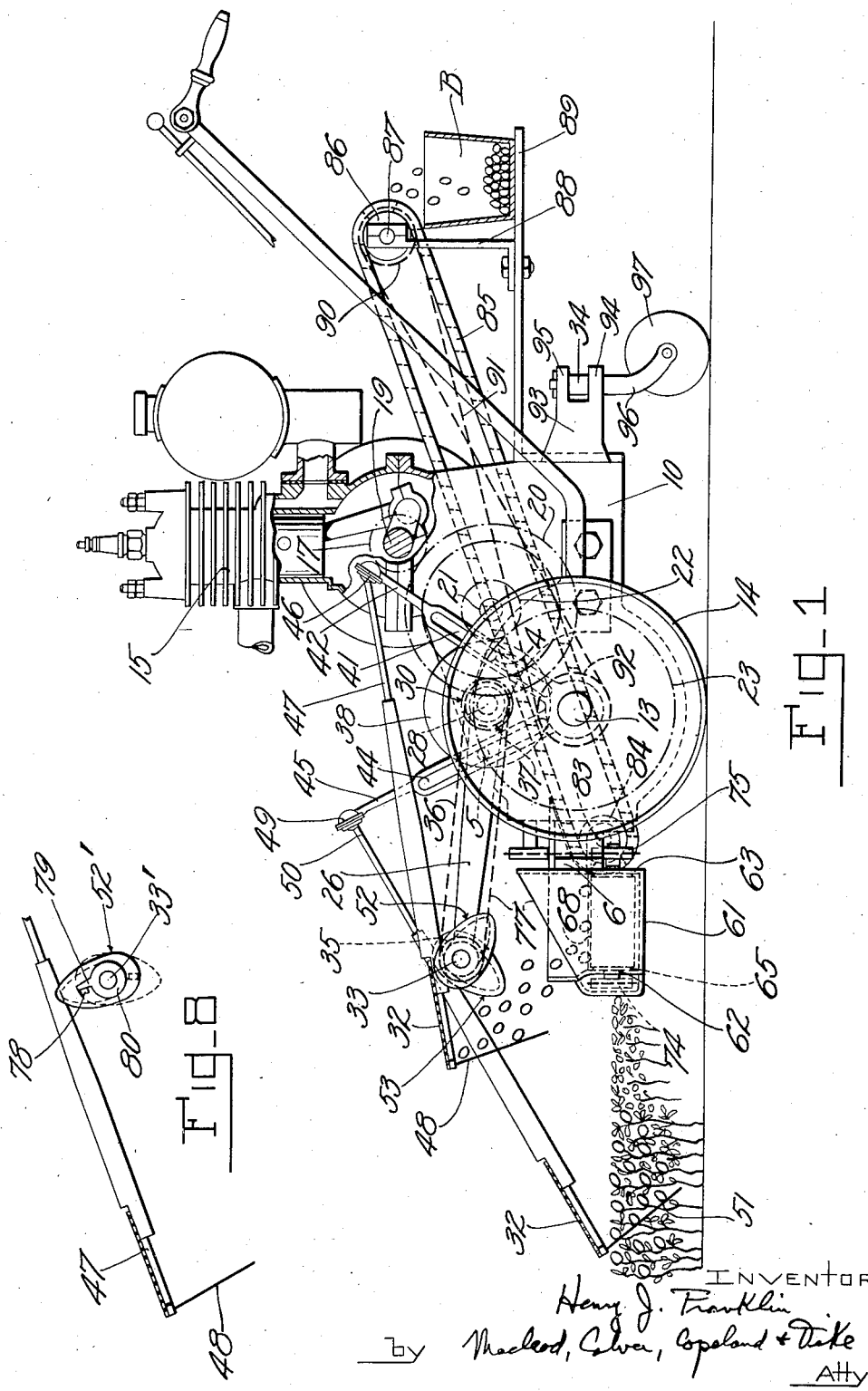

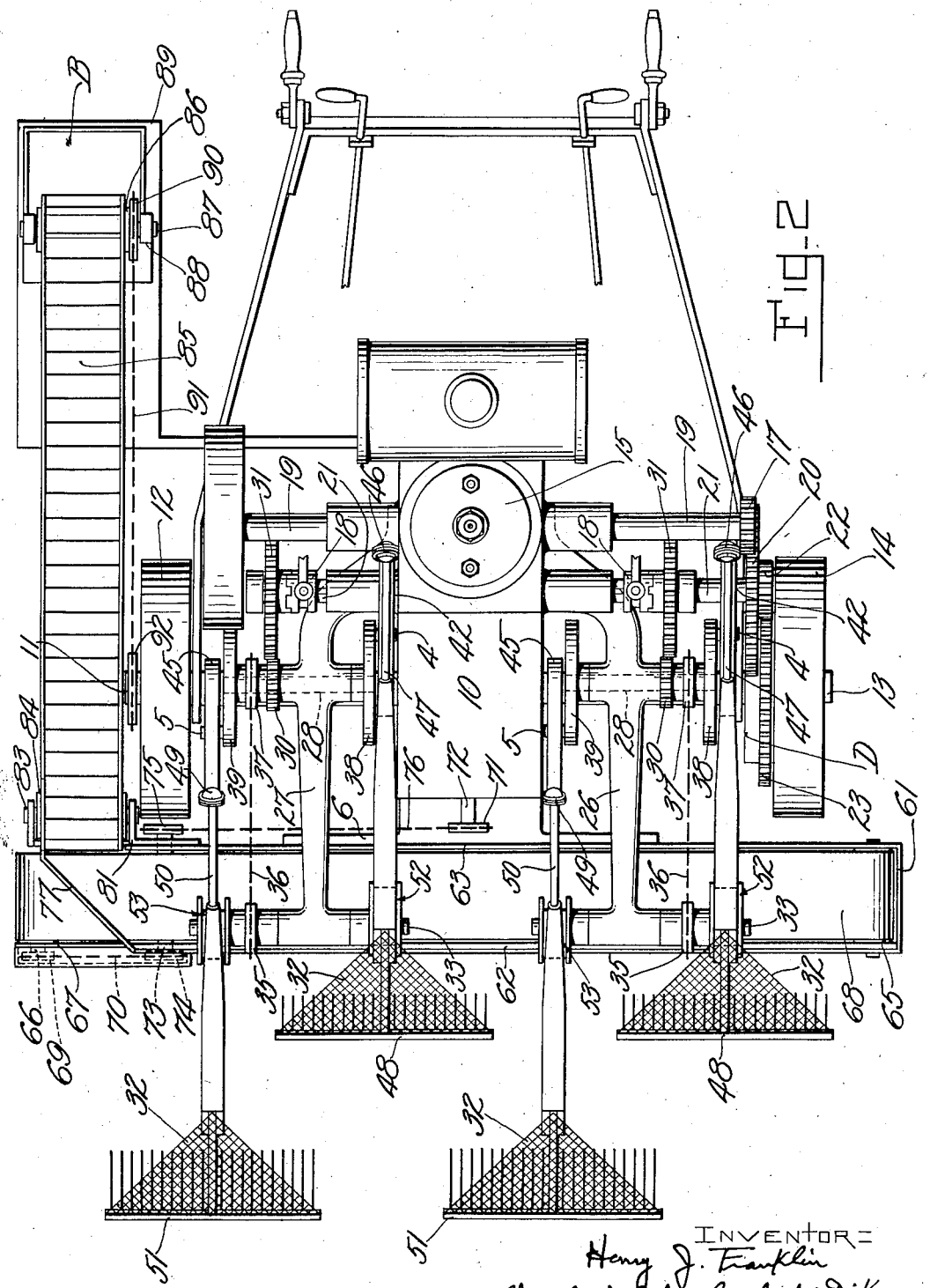

April 14, 1936. H. J. FRANKLIN 2,037,624
BERRY PICKING MACHINE
Filed July 27, 1934 3 Sheets-Sheet 3
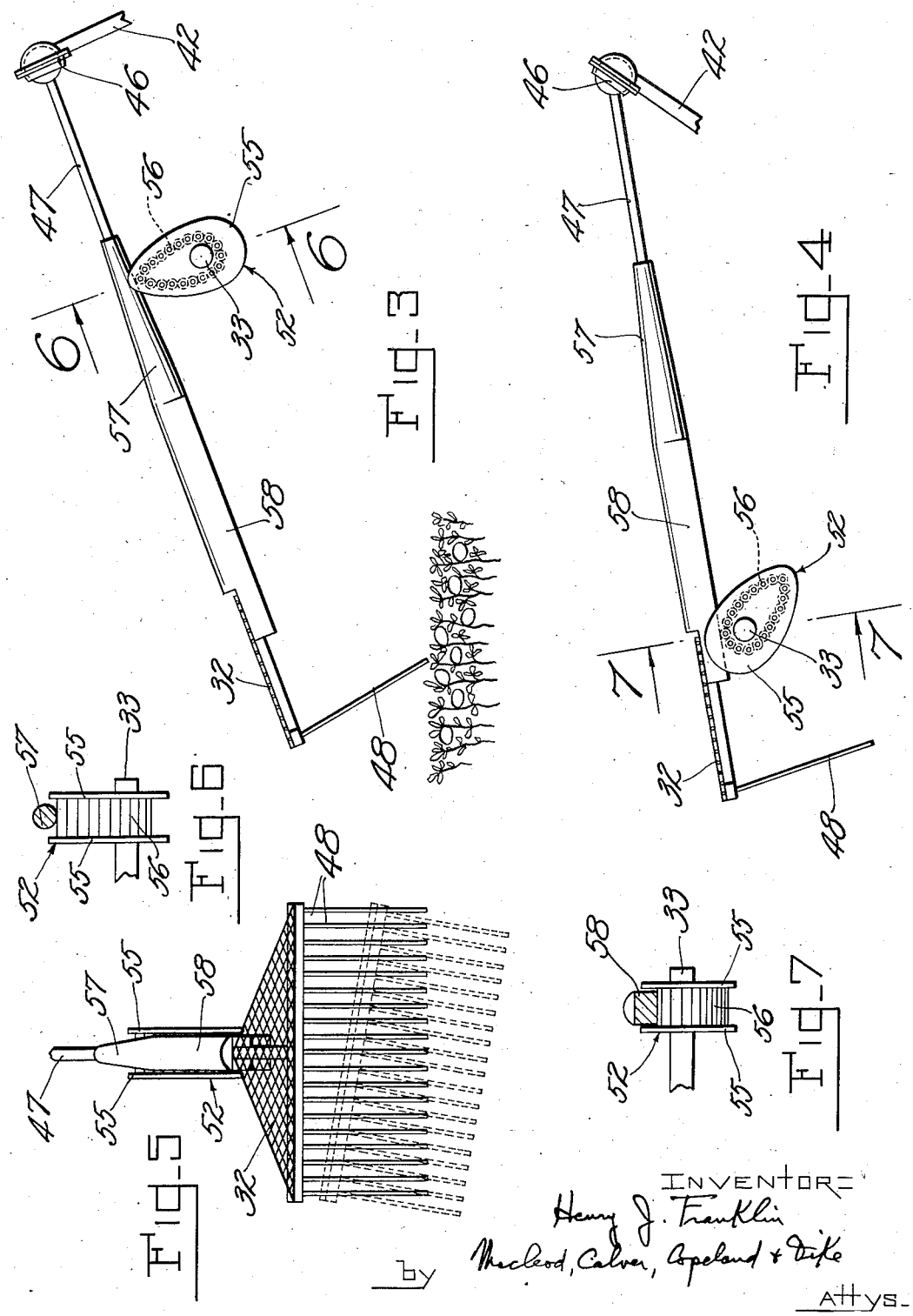

Patented Apr. 14, 1936

2,037,624

UNITED STATES PATENT OFFICE 2,037,624

BERRY PICKING MACHINE

Henry J. Franklin, Wareham, Mass.

Application July 27, 1934, Serial No. 737,229

8 Claims. (Cl. 56—330)

This invention relates to machines for picking berries, such as cranberries. The only machines now available on the market for this purpose are complicated and heavy and, consequently, their cost is high. Furthermore, the cost of harvesting when using these machines, considering their initial cost, the cost of upkeep and their picking capacity, is not sufficiently low as compared to the cost of harvesting by hand picking to warrant their use by many cranberry growers.

It is an object of the present invention to provide a berry picking machine which can be made at a lower cost and which will possess a greater picking capacity than machines heretofore available.

The invention will be more clearly understood from the following description in conjunction with the accompanying drawings: in which, Fig. 1 is a side elevational view of a machine embodying the invention;

Fig. 2 is a plan view of the same;

Figs. 3 and 4 are detail side elevational views of a portion of the machine illustrating different positions assumed during operation;

Fig. 5 is a front elevation of the parts shown in Fig. 3;

Figs. 6 and 7 are sectional views taken on the lines 6—6 and 7—7 respectively of Figs. 3 and 4; and Fig. 8 is a view similar to Figs. 3 and 4 illustrating a modified construction.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

As illustrated in the accompanying drawings a machine embodying the invention may comprise a main frame 10 in which an axle 11 is mounted for rotation. Fixed upon one end of the axle 11 is a drive wheel 12 and its other end is connected through a differential D to an axle 13 upon which is fixed a drive wheel 14. A motor 15 of the internal combustion type is suitably mounted upon the frame 10. A pinion 17 is fixed upon the crank shaft 19 of the motor and is adapted to engage a gear 20 fixed upon a shaft 21 rotatably mounted in the frame 10. A gear 22 is fixed upon the shaft 21 and is adapted to engage a gear 23 for driving the drive wheels 12 and 14 through the differential D.

Brackets 26 and 27 are suitably fixed upon opposite sides of the frame 10. A shaft 28 is mounted for rotation in each of the brackets 26 and 27. Upon each of the shafts 28 is fixed a gear 30 adapted to engage a gear 31 upon the shaft 21 which is driven through a clutch 18. A cam shaft 33 is rotatably mounted in suitable bearings in the outer end of each of the brackets 26 and 27. Fixed upon each cam shaft 33 is a sprocket wheel 35. The sprocket wheels 35 are driven through chains 36 by sprocket wheels 37 fixed upon the shafts 28.

A pair of disks 38 and 39 are suitably fixed upon each of the shafts 28. Each of the disks 38 carries a pin 4 adapted to engage a slot 41 in an arm 42 which is pivotally mounted upon the axle 11. Likewise, each of the disks 39 carries a pin 5 adapted to engage a slot 44 in an arm 45 which is pivotally mounted upon the axle 11. One end of each of the arms 42 is connected through a universal joint 46 with the arm 47 and one end of each of the arms 45 is connected through a universal joint 49 with an arm 50. The arms 47 and 50 extend forwardly over the cam shafts 33 and rest upon cams 52 and 53 respectively carried by said shafts.

Rakes 48 and 51 are secured to the other ends of the arms 47 and 50 respectively. Each of the rakes is provided with a screen 32 extending rearward from its upper edge. Each of the cams 52 and 53 comprises a pair of spaced disks 55 in which a series of bearing rolls 56 are rotatably mounted and arranged in cam formation. The disks 55 extend radially outward from the shaft 33 so as to provide guide flanges for the arms 47 and 50. Each of the arms 47 and 50 is provided with an intermediate portion having adjacent sections 57 and 58 of circular and rectangular cross section respectively for a purpose described hereinafter. The sections 57 taper gradually into the sections 58.

The pins 4 and 5 are so arranged upon the disks 38 and 39 as to cause the rakes 48 and 51 to reciprocate forward and rearward and to reach the corresponding points in their paths of travel at different times. The cams 52 and 53 are so arranged as to permit the rakes 48 and 51 to move downwardly when near the forward end of their strokes and to move the rakes upwardly as they are approaching the forward end of their strokes.

A bracket 6, suitable fixed upon the forward end of the frame 10, carries a transversely extending trough 61 having front and rear walls 62 and 63. An idler roll 65 extends between the front and rear walls 62 and 63 near one end of the trough and is suitably mounted for rotation therein. A shaft 66 carrying a roll 67 is rotatably mounted near the other end of the trough. The rolls 65 and 67 carry an endless conveyor belt 68. A shaft 73 is mounted for rotation in the walls 62 and 63 of the trough 61 and carries sprocket wheels 74 and 75. A sprocket wheel 69 is fixed upon the shaft 66 and is driven through a chain 70 from the sprocket wheel 74. The sprocket wheel 75 is driven through a chain 76 from a sprocket wheel 71 fixed upon a shaft 72 which is driven by suitable mechanism (not shown) from the motor 15.

A bracket 81 is suitably fixed upon the rear wall 63 of the trough 61 and is provided with suitable bearings for rotatably supporting a shaft 83 upon which is carried a roll 84 for supporting one end of an endless bucket conveyor 85. The other end of the conveyor 85 is supported by a roll 86 fixed upon a shaft 87 which is mounted for rotation in suitable bearings in a bracket 88 fixed upon a shelf 89 extending rearwardly from the main frame 10. A pulley 90 is fixed upon the shaft 87 and is driven by a crossed belt 91 from a pulley 92 fixed upon the axle 11. The shelf 89 is adapted to support a receptacle, such as a box B, beneath the rear end of the bucket conveyor 85. A baffle 77 secured to the front wall 62 of the trough 61 extends obliquely over the conveyor belt 68 and serves to deflect berries from the conveyor 68 to the conveyor 85.

A bracket 93 having forked arms 94 and 95 is secured to the rear end of the frame 10. A shaft 96 is mounted for rotation in the forked arms 94 and 95 and is provided with a collar 34 positioned between the arms 94 and 95 for preventing axial movement of the shaft. A wheel 97 is rotatably carried by the lower end of the shaft 96 and serves to support the rear end of the machine.

In the operation of the machine, it will be understood that the wheels 12 and 14 are driven from the motor 15 to move the machine and to operate the mechanism carried thereby. The rakes 48 and 51 are reciprocated forward and rearward and when the rake arms 47 and 50 are near the forward end of their strokes the cams 52 and 53 are moving so they are brought in contact progressively from their high point to their low point with the sections 57 of the arms 47 and 50 thus permitting the rakes 48 and 51 to dig down into the cranberry vines. Thereafter, the rakes 48 and 51 are moved rearward at a relatively rapid rate to strip the berries from the vines. While the rakes are moving rearward the arms 47 and 50 are in contact with a low point of the cams 52 and 53. As the rearward movement of the rakes continues they are raised. The momentum thus imparted to the berries causes them to be thrown on the conveyor 68. The conveyor 68 transports the berries toward the baffle 77 which deflects and deposits them on to the bucket conveyor 85 which conveys and deposits them in the bucket B.

The universal joints 46 and 49 permit turning movement of the arms 47 and 50 when the sections 57 thereof are in engagement with the cams 52 and 53 so as to permit the rakes 48 and 51 to accommodate themselves to any irregularities of the ground or obstructions in the vines, as illustrated in Figs. 3, 5, and 6. The rakes are again returned to their normal substantially horizontal position when the sections 58 of the arms engage the cams 52 and 53 as shown in Figs. 4 and 7. As illustrated, the adjacent rakes 48 and 51 are of such a length as to overlap transversely their respective paths of travel and the outer rakes 48 and 51 are so positioned as to extend laterally beyond the path of travel of the drive wheels 12 and 14 so as to strip the berries from the vines in the path of the wheels. It will be understood that the mechanism is so arranged as to cause the rakes 48 and 51 to move through several cycles during one rotation of the drive wheels 12 and 14 and successive movements of each of the rakes 48 and 51 through the vines overlap so as to remove substantially all the berries as the machine travels forward.

Fig. 8 illustrates a construction which may be used in place of the cams 52 and 53 previously described and which comprises a cam 52' constructed similar to the cams 52 and 53 but loosely mounted upon the cam shaft 33'. The cam 52' is provided with a lug 78 adapted to be engaged by an arm 79 carried by a collar 80 fixed upon the cam shaft 33'. The arm 79 is adapted to drive the cam 52' through half one revolution, that is, from the position shown in dotted line to that shown in full line, and the cam is moved another half revolution by the action of gravity.

In the operation of the machine embodying the construction shown in Fig. 8, the cam 52' is driven positively from the position shown in dotted line to that shown in full line as the rakes 48 and 51 approach the forward end of their strokes to bring the high point of the cam in contact with the rake arms and raise the rakes. The cam 52' then moves quickly due to the action of gravity from the full line position to the dotted line position, thereby permitting the rake arms to move from the high point to the low point of the cam and causing the rakes to dig down into the berry vines. As the rakes move rearward to strip berries from the vines and throw them on to the conveyor 68, the arm 79 moves toward the lug 78 so as to engage it and move the cam 52' from the dotted line position to the full line position as the rakes move forward.

I claim:

1. In a berry picking machine having a chassis movable along a desired path and a conveyor movable transverse to said path, the combination therewith of a berry gathering mechanism comprising a plurality of rakes, means for actuating said rakes to cause them to move in said path forward and then downward into the berry vines, rearward to strip berries from said vines and then upward and rearward toward their initial position to throw the berries onto said conveyor.

2. In a berry picking machine having a chassis movable along a desired path and a conveyor movable transverse to said path, the combination therewith of a berry gathering mechanism comprising a plurality of rakes, means for actuating said rakes to cause them to reciprocate forward and rearward along said path, means for causing the rakes to move downward into the berry vines and remain in a lowered position during the first part of their rearward movement to strip berries from the vines and then be raised as the rearward movement continues to cause the berries to be thrown onto said conveyor.

3. In a berry picking machine having a chassis movable along a desired path and a conveyor movable transverse to said path, the combination therewith of a berry gathering mechanism comprising a plurality of rakes, means for actuating said rakes to cause them to move in said path forward and then downward into the berry vines, rearward to strip berries from said vines and then upward and rearward toward their initial position to throw the berries onto said conveyor, said rakes being arranged so that the paths of travel of adjacent rakes through the vines overlap each other and overlap the path of travel of said chassis.

4. In a berry picking machine having a chassis movable along a desired path and a conveyor movable transverse to said path, the combination therewith of a berry gathering mechanism comprising a plurality of rakes, means for actuating said rakes to cause them to move in said path forward and then downward into the berry vines, rearward to strip berries from said vines and then upward and rearward toward their initial position to throw the berries onto said conveyor, and means for permitting said rakes to turn about an axis extending in the general direction of said path while the rakes move through the vines and thereafter causing the rakes to turn about said axis in the opposite direction an equal amount.

5. In a berry picking machine having a chassis movable along a desired path and a conveyor movable transverse to said path, the combination therewith of a berry gathering mechanism comprising a plurality of rakes, means for actuating said rakes to cause them to reciprocate forward and rearward along said path, means for causing the rakes to move downward into the berry vines and remain in a lowered position during the first part of their rearward movement to strip berries from the vines and then be raised as the rearward movement continues to cause the berries to be thrown onto said conveyor, said rakes being arranged so that the paths of travel of adjacent rakes through the vines overlap each other and overlap the path of travel of said chassis.

6. In a berry picking machine having a chassis movable along a desired path and a conveyor movable transverse to said path, the combination therewith of a berry gathering mechanism comprising a plurality of rakes, means for actuating said rakes to cause them to reciprocate forward and rearward along said path, means for causing the rakes to move downward into the berry vines and remain in a lowered position during the first part of their rearward movement to strip berries from the vines and then be raised as the rearward movement continues to cause the berries to be thrown onto said conveyor, and means for permitting said rakes to turn about an axis extending in the general direction of said path while the rakes move through the vines and thereafter causing the rakes to turn about said axis in the opposite direction an equal amount.

7. In a berry picking machine having a chassis movable along a desired path and a conveyor movable transverse to said path, the combination therewith of a berry gathering mechanism comprising a plurality of rakes, means operatively associated with each rake to reciprocate it forward and rearward along said path and to move upward near the rear end of its travel and downward near the forward end of its travel including a cam.

8. In a berry picking machine having a chassis movable along a desired path and a conveyor movable transverse to said path, the combination therewith of a berry gathering mechanism comprising a plurality of rakes, means for reciprocating each rake forward and rearward along said path, a freely rotatable cam for supporting each rake during its movement, and means for actuating said cams to rotate the same a part of a revolution to raise the rakes while permitting the cams to complete their revolutions by the action of gravity.

HENRY J. FRANKLIN.